(12) United States Patent
Hurlburt (10) Patent No.: US 6,766,872 B2
(45) Date of Patent: Jul. 27, 2004

(54) REAR AXLE SUSPENSION MECHANISM FOR UTILITY VEHICLES

(75) Inventor: Joseph C. Hurlburt, Lancaster, PA (US)

(73) Assignee: New Holland North America, Inc., New Holland, PA (US)

( * ) Notice: Subject to any disclaimer, the term of this patent is extended or adjusted under 35 U.S.C. 154(b) by 10 days.

(21) Appl. No.: 10/212,866

(22) Filed: Aug. 7, 2002

(65) Prior Publication Data
US 2004/0026156 A1 Feb. 12, 2004

(51) Int. Cl.[7] ............................................. B62D 61/10
(52) U.S. Cl. ............. 180/24.12; 180/350; 280/124.116; 280/124.156
(58) Field of Search ........................... 180/21, 22, 350, 180/357, 240.9, 24.11, 24.12; 280/124.156, 124.116

(56) References Cited

U.S. PATENT DOCUMENTS

| | | | | |
|---|---|---|---|---|
| 2,139,937 A | * | 12/1938 | Collender ................ 180/24.01 |
| 2,367,434 A | * | 1/1945 | Roos ......................... 180/9.58 |
| 2,954,985 A | * | 10/1960 | Drong ........................ 280/685 |
| 3,157,238 A | * | 11/1964 | Kraemer et al. ......... 180/24.11 |
| 3,332,702 A | * | 7/1967 | Rosenkrands ........ 280/124.107 |
| 4,487,429 A | * | 12/1984 | Ruggles ..................... 280/5.521 |
| 4,664,208 A | * | 5/1987 | Horiuchi et al. .............. 180/23 |
| 4,706,770 A | | 11/1987 | Simon |
| 5,191,952 A | * | 3/1993 | Satzler et al. ............. 180/9.52 |
| 5,337,849 A | * | 8/1994 | Eavenson et al. ........ 180/24.12 |
| RE35,168 E | * | 3/1996 | Golpe ......................... 280/666 |
| 5,918,692 A | * | 7/1999 | Sekita et al. ................. 180/56 |
| 6,488,110 B2 | * | 12/2002 | Price ........................... 180/251 |
| 6,536,545 B1 | | 3/2003 | Hurlburt |
| 6,601,665 B2 | * | 8/2003 | Hurlburt .................. 180/24.11 |
| 6,629,699 B2 | * | 10/2003 | Hurlburt ................. 280/24.111 |

FOREIGN PATENT DOCUMENTS

JP 1-311963 A * 12/1989

* cited by examiner

Primary Examiner—Ruth Ilan
(74) Attorney, Agent, or Firm—John William Stader; Collin A. Webb (57) ABSTRACT

A utility vehicle includes a middle axle that is mounted at the end of a bogey beam for flotational movement relative to the frame of the vehicle. The rear axle is carried by a suspension mechanism supported from the frame of the vehicle. The middle axle is formed by a pair of stub axles interconnected by a support beam that is pivotally connected to the rearward end of the bogey beam. The rear suspension mechanism includes a pair of transversely spaced suspension struts interconnecting the frame and a rear axle member having the rear drive wheels mounted thereon. Connecting support links interconnecting the middle and rear axles maintain proper positional spacing between the middle and rear axles.

8 Claims, 8 Drawing Sheets

REAR AXLE SUSPENSION MECHANISM FOR UTILITY VEHICLES

FIELD OF THE INVENTION

The present invention relates generally to off-road motor vehicles, such as utility or recreational vehicles, and more particularly, to a suspension mechanism for the rear axle of an off-road utility vehicle.

BACKGROUND OF THE INVENTION

Small off-road vehicles such as utility or recreational vehicles are becoming popular for recreational and other general purpose off-road usage. Such utility vehicles can be found in U.S. Pat. No. 4,706,770. These utility vehicles have found usage on golf courses and at sporting events, and are particularly adaptable for utilization on a farm. This type of flexibility in the wide variety of uses necessitates a vehicle that is highly flexible, highly maneuverable and the like. This demands a vehicle that will afford a high degree of maneuverability and ease of steering.

Steering characteristics of known utility vehicles provide poor turning performance. Known utility vehicles have turning clearance circles having a diameter greater than twenty-one feet. The use of independent front wheel suspension mechanisms on known utility vehicles, coupled with the mounting of the rack and pinion systems on the frame of the vehicle, introduces minor king pin rotations as the steering tires ride over ground undulations. Such construction reduces steering precision and can accelerate the wear of the tires on the steering axle.

Placing a load on the utility vehicle typically results in a variation in the steering performance of known utility vehicles. For example, one known embodiment having a front steering axle, a rear drive axle, and a middle drive axle carries the load placed on the vehicle on the middle and rear axles, resulting in proportionately less weight on the steering axle and a reduction in maneuverability. Accordingly, known utility vehicle construction results in a significant influence on the steering performance by the load carried on the vehicle. Preferably, loads should not change the steering characteristics for any vehicle.

Furthermore, conventional utility vehicle construction mounts both the middle and rear axles directly to the frame of the vehicle, resulting in a harsh ride characteristic and direct application of any load placed into the load bed onto the middle axle as well as the rear drive axle. It would, therefore, be desirable to enhance the ride characteristics, as well as the steering performance of utility vehicles by providing a suspension mechanism for the rear axle and by distributing the weight of the loads being carried between the front and middle axles.

It is therefor desirable to provide a utility and recreational vehicle that overcomes the disadvantages of the known prior art utility vehicles.

SUMMARY OF THE INVENTION

Accordingly, an important object of the present invention is to provide a rear axle suspension mechanism for a utility vehicle having a bogey beam apparatus interconnecting the front and middle axles.

It is another object of this invention to provide a support mechanism for the middle axle on a utility vehicle to provide flotational movement of the middle axle relative to the frame.

It is a further object of this invention to provide support for the middle axle of a utility vehicle in such a manner as to prevent the load placed thereon from overcoming the steering operation of the front axle.

It is a feature of this invention to add a bogey beam extending longitudinally at the center line of the utility vehicle to interconnect the front and middle axles.

It is another feature of this invention that a portion of the load placed into the load bed of the utility vehicle will be distributed to the bogey beam to be re-distributed to the front and middle axles in a predetermined proportion.

It is an advantage of this invention that maneuverability of the utility vehicle is maintained during load bearing operations.

It is a another advantage of this invention that the middle axle provides the ability to oscillate and float relative to the frame of the utility vehicle.

It is still another advantage of this invention that the ride characteristics of a utility vehicle are improved, particularly under load bearing conditions.

It is still another feature of this invention that the loads placed on the load bed of the utility vehicle are proportionally distributed between the front steering axle and the middle drive axle of the utility vehicle.

It is a yet another advantage of this invention that the Rotational movement of the middle axle provides sufficient slack in the drive mechanism to permit the chain drive to twist slightly in response to the oscillation of the middle axle.

It is yet another feature of this invention that a central support bracket pivotally connecting a support beam for the middle axle to the bogey beam allows a Rotational movement of the middle axle with the bogey beam and with longitudinally stabilizing support links.

It is yet another object of this invention to provide a suspension mechanism for the rear axle that is cooperable with the configuration of the middle and front axles interconnected by a bogey beam.

It is a further feature of this invention that the ride characteristics of a utility vehicle are greatly improved by a suspended rear axle and a load distributing bogey beam interconnecting the front and middle axles.

It is still a further feature of this invention that the middle and rear axles are independently movable relative to the frame of the utility vehicle to enhance the ride characteristics of the vehicle.

It is a further advantage of this invention that the middle and rear axles can be operatively powered to drive the utility vehicle over the surface of the ground.

It is a further object of this invention to provide a rear axle suspension mechanism for an off-road vehicle that is durable in construction, inexpensive to manufacture, carefree in maintenance, easy to assemble, and simple and effective in use.

These and other objects, features, and advantages are accomplished according to the present invention by providing a utility vehicle having a middle axle that is mounted at the end of a bogey beam for flotational movement relative to the frame of the vehicle. The rear axle is carried by a suspension mechanism supported from the frame of the vehicle. The middle axle is formed by a pair of stub axles interconnected by a support beam that is pivotally connected to the rearward end of the bogey beam. The rear suspension mechanism includes a pair of transversely spaced suspension struts interconnecting the frame and a rear axle member having the rear drive wheels mounted thereon. Connecting support links interconnect the middle and rear axles maintain proper positional spacing between the middle and rear axles.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENTS

Figure 1:
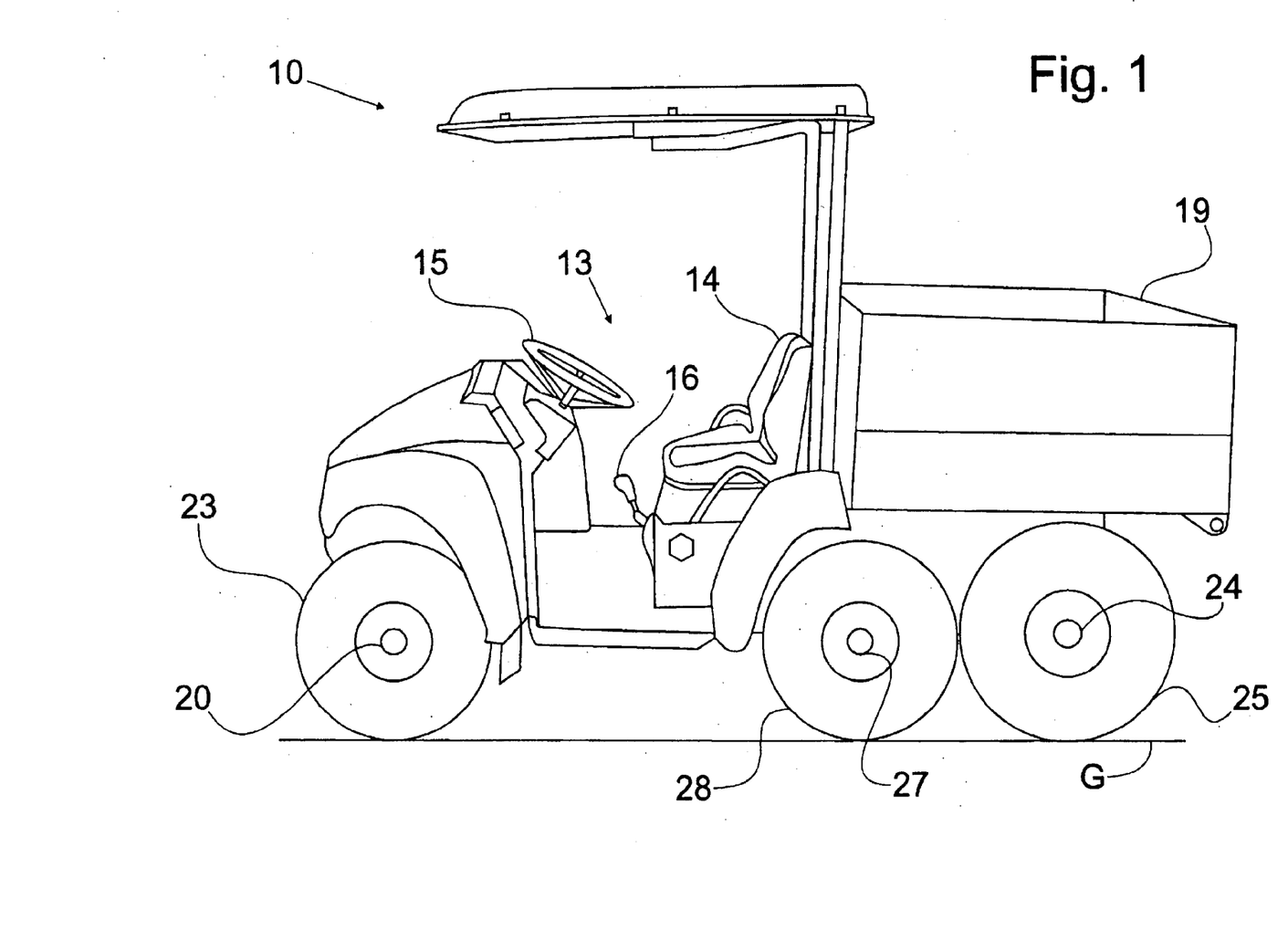
FIG. 1 is side perspective view of a utility vehicle incorporating the principles of the present invention.
Figure 2:
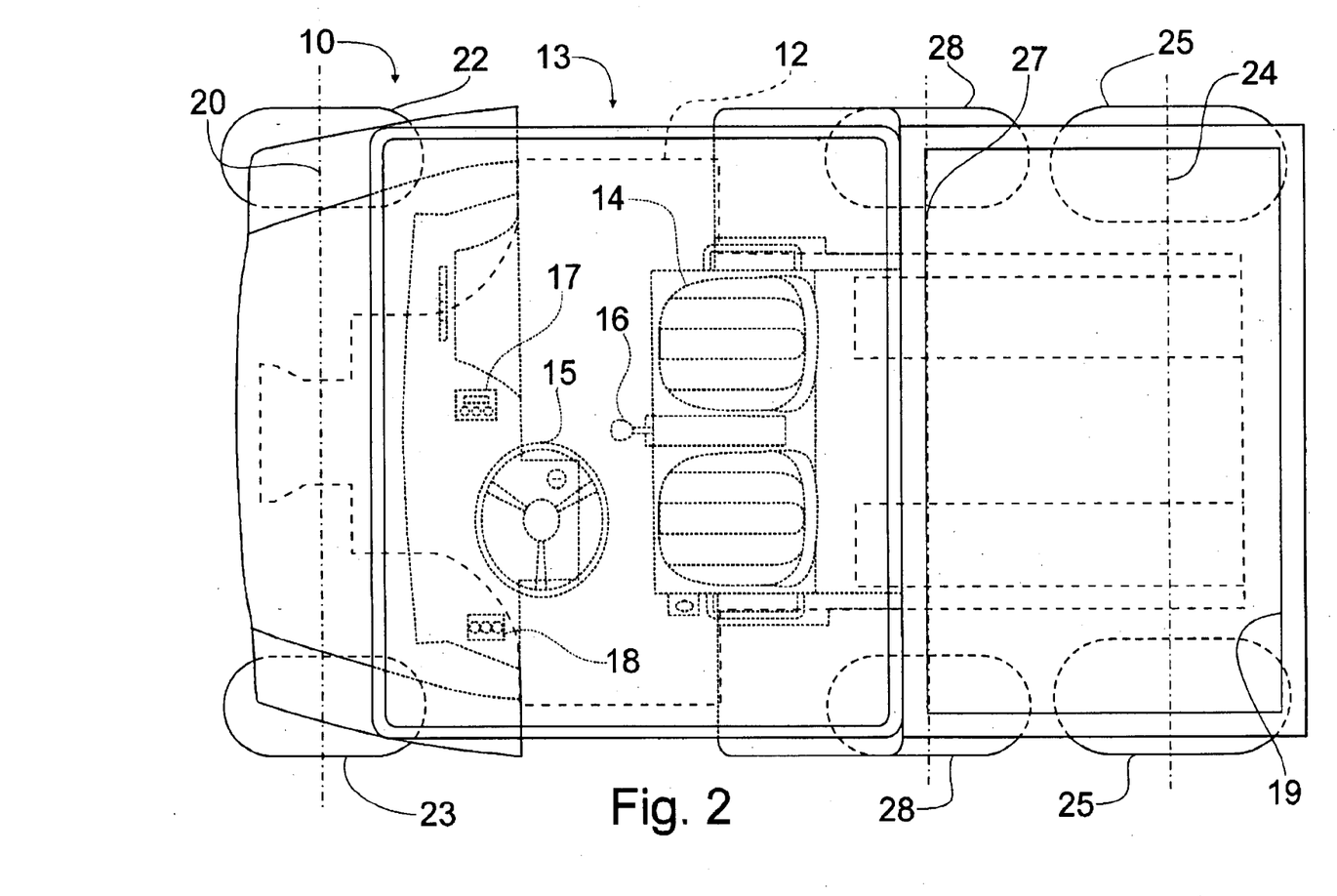
FIG. 2 is a top plan view of the utility vehicle of FIG. 1, the seats and control apparatus being shown in dashed lines, the frame and axles being shown in phantom.
Figure 3:
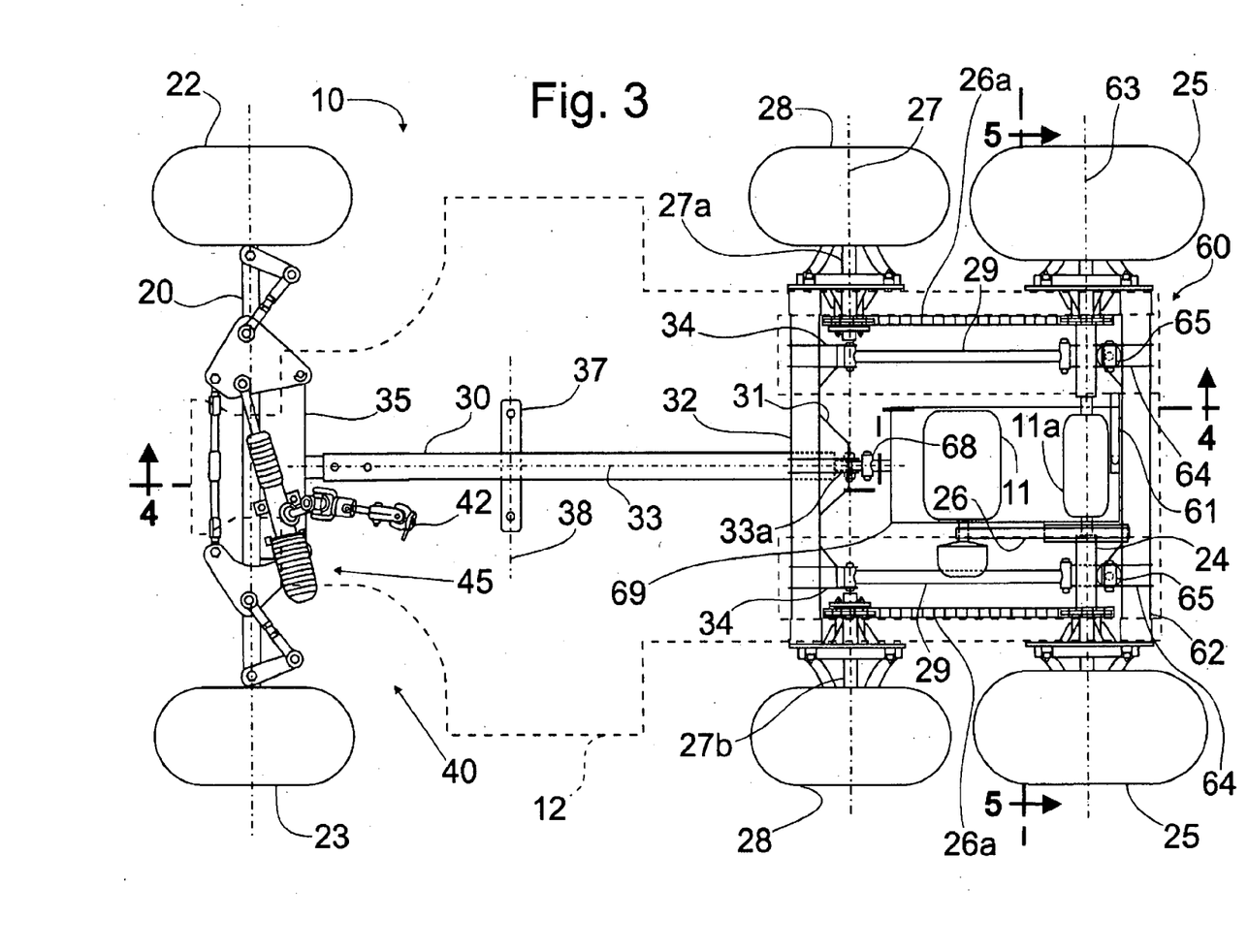
FIG. 3 is a top plan view of the frame and drive mechanism with the chassis removed for purposes of clarity.

Referring to FIGS. 1–3, a utility vehicle incorporating the principles of the present invention can best be seen. Any left and right references are used as a matter of convenience and are determined by standing at the rear of the vehicle and facing forwardly into the direction of travel.

The utility vehicle 10 includes a frame 12 supported above the ground G by a pair of steered wheels 22, 23 mounted on a front steering axle 20 and by a pair of driven wheels 25 mounted on a rear drive axle 24. In the preferred embodiment depicted in FIGS. 1–3, a middle drive axle 27 is also provided with a pair of opposing support wheels 28. The frame 12 supports an operator compartment 13 including seats 14 for the comfort of the operator and control apparatus, such as a conventional steering wheel 15 and a gear shift lever 16. A throttle control 17 and a brake control 18, along with other conventional control devices, are also included within the operator compartment 13 for the control of the vehicle 10. The frame 12 also supports a load bed 19 rearwardly of the operator compartment 13 over the middle and rear drive axles 27, 24 respectively, to carry cargo over the surface of the ground G.

Referring now to FIG. 3, the frame 12 with the axles 20, 24, 27 mounted thereon can best be seen. The rear drive axle 24 is rotatably supported from the frame 12 and is powered by a drive mechanism 26 powered by an engine 11. The rear drive axle 24 with drive mechanism 26 and engine 11 are suspended for generally vertical movement relative to the frame by a suspension mechanism 60, as will be described in greater detail below. The middle axle 27 is pivotally supported from the rear axle 24 by a pair of support links 29 and is connected to the rearward end of a bogey beam 30, which also will be described in greater detail below. The middle axle 27 is preferably formed as a pair of stub shafts 27a, 27b connected to said respective support links 29. A support beam 32 is pivotally mounted on a rearward end of the bogey beam 30 for oscillatory movement about a longitudinally extending pivot axis 33. The support wheels 28 on the middle axle 27 are driven by respective chain drives 26a to provide a four wheel drive capability for the vehicle 10. The details of the middle axle support mechanism is described in greater detail in co-pending U.S. patent application Ser. No. 09/964,477, filed Sep. 28, 2001, entitled "Middle Axle Support Apparatus for Utility Vehicles", the description of which is incorporated herein by reference.

The front steering axle 20 is attached to the forward end of the bogey beam 30 which is formed as a mounting member 35 for the steering axle 20. Similar to the support beam 32, the front steering axle 20 is configured to oscillate about the longitudinally extending pivot axis 33 carried by the bogey beam 30 to provide the ability to accommodate ground undulations and the like. The bogey beam 30 is pivotally connected to the frame 12 by a pivot assembly 37 positioned beneath the operator compartment 13 to provide an oscillation and possible suspension of the bogey beam 30 about the transverse pivot axis 38. Accordingly, the front steering axle 20 and the middle axle 27 generally oscillate in opposing vertical directions on opposite ends of the bogey beam 30 due to the pivotal mounting thereof by the pivot assembly 37. The front steering axle 20 and the middle axle 27 are mounted for independent oscillation about the longitudinal axis 33 to allow tires 22, 23, 25, and 28 to maintain contact with the ground G during operation of the utility vehicle 10.

The pivot assembly 37 can be formed as a simple pin assembly connecting the bogey beam 30 to the frame 12 of the vehicle 10 to define the transverse pivot axis 38, as is shown in the drawings. The pivot assembly 37 can also suspend the bogey beam 30 from the frame 12 by providing a link (not shown) that pivotally connects at one end to the bogey beam 30 and is centrally connected to the frame 12 with the opposing end of the link being connected to a spring mechanism (not shown) that provides some resiliency between the bogey beam 30 and the frame 12. Under such a suspended bogey beam arrangement, the transverse pivot axis 38 would be located at the pivotal connection between the link (not shown) and the bogey beam 30, but would be vertically movable relative to the frame 12 about the pivotal connection between the link (not shown) and the frame 12, the spring mechanism (not shown) interconnecting the frame 12 and the link (not shown) to offset forces encountered by the bogey beam 30. The location of the central pivot on the link (not shown), pivotally connecting the link to the frame 12, being positioned between the opposing ends of the link to provide the desired resiliency for the selected size of the spring mechanism.

Also referring to FIGS. 1 and 2, any load placed in the load bed 19 will be transferred to the rear axle 24 through the suspension mechanism 60 and to the bogey beam 30 via the pivot assembly 37. The weight carried by the bogey beam 30 will be shared in a proportionate manner between the front steering axle 20 and the middle axle 27. The respective proportions will be determined by the location of the pivot assembly 37 along a length of the bogey beam 30. Accordingly, any load transferred to the bogey beam 30 will always be proportionately divided between the front steering axle 20 and the middle axle 27. As a result, the steering characteristics will not be impacted by any load placed into the load bed 19, as the middle axle 27 cannot overpower the front steering axle 20.

As depicted in FIG. 3, the front steering axle 20 is operatively associated with a steering mechanism 40 to effect turning movement of the steered wheels 22, 23. The steering mechanism 40 is actuated through manipulation of the steering wheel 15 by the operator through the universal connecting linkage 42. The steering mechanism 40 may include a rack and pinion assembly 45 which includes a conventional pinion (not shown) rotatably associated with the steering wheel 15 and a conventional rack that is linearly movable in conjunction with the rotation of the pinion in a known manner.

Figure 4:
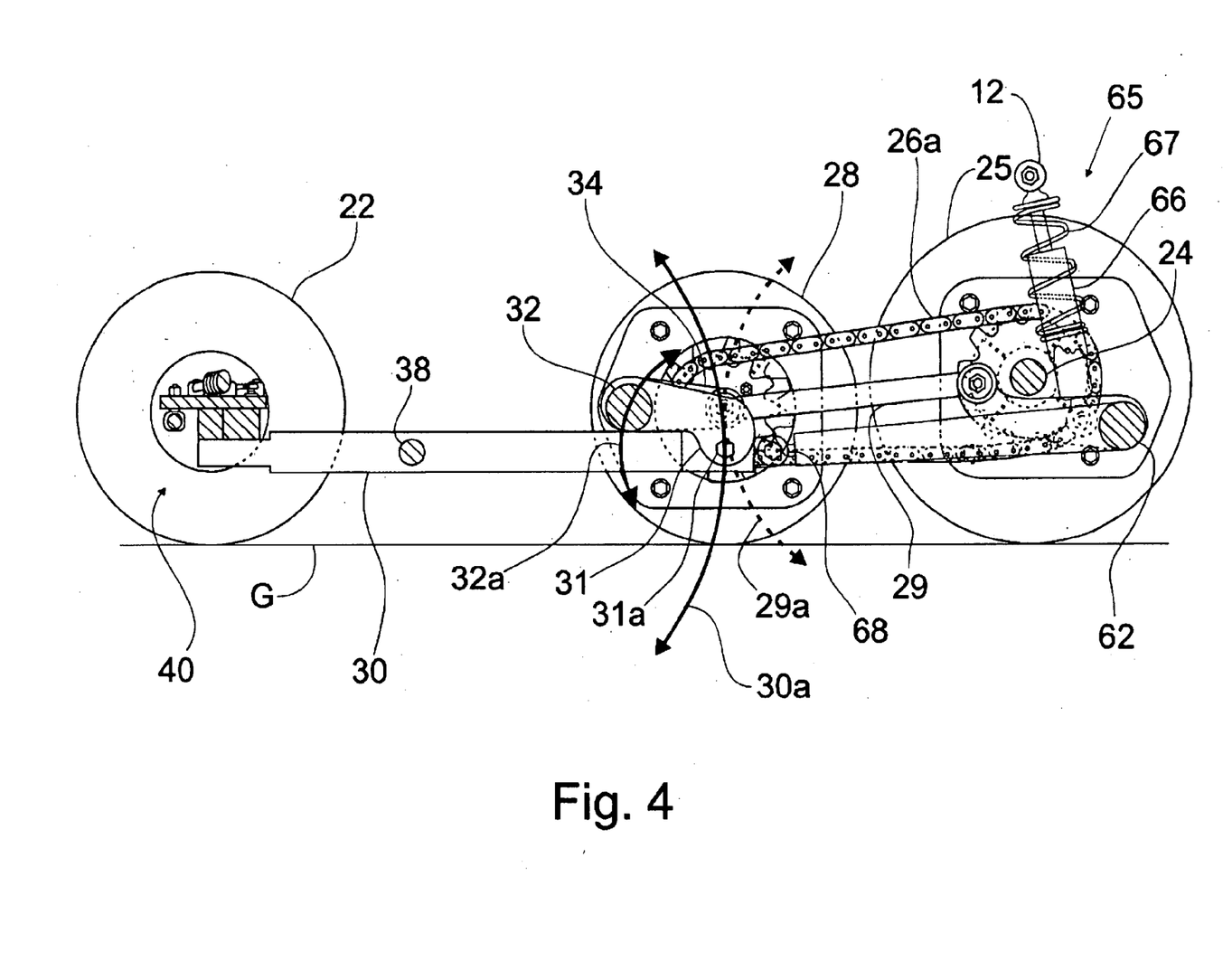
FIG. 4 is an enlarged cross-sectional view of the utility vehicle taken along lines 4—4 of FIG. 3 to show the drive mechanism and the orientation of the bogey beam supporting the front steering axle and the middle drive axle, as well as the orientation of the rear axle suspension mechanism.
Figure 5:
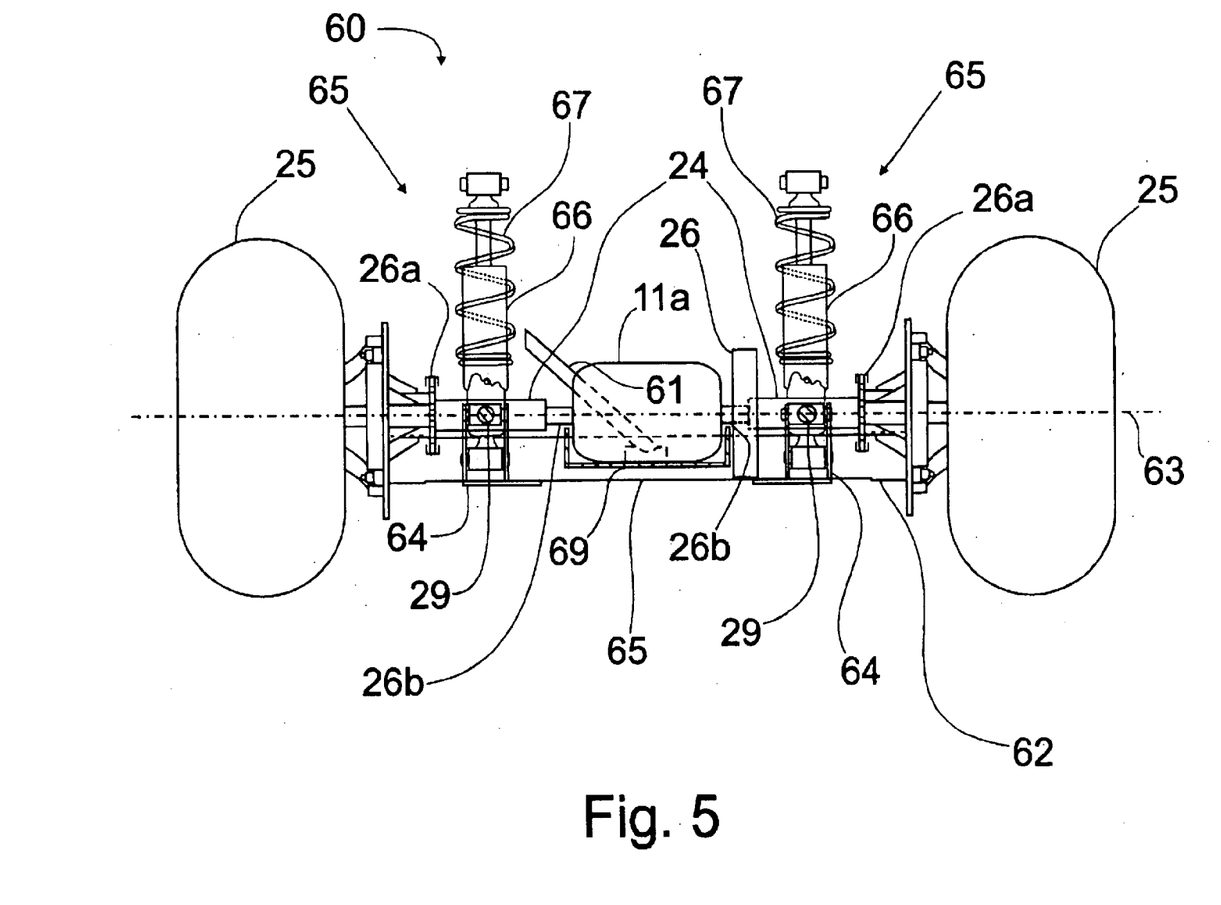
FIG. 5 is an enlarged cross-sectional view of the utility vehicle taken along lines 5—5 of FIG. 3 to show an elevational view of the rear drive axle and the suspension mechanism associated therewith.

Referring now to FIGS. 3–5, the details of the bogey beam construction and the support of the middle drive axle 27 can best be seen. The support beam 32 at the rear end of the bogey beam 30 has the stub axles 27a, 27b mounted directly to the laterally opposing ends of the support beam 32. The support beam 32 further has a pair of mounting brackets 34 projecting rearwardly therefrom interiorly of the stub shafts 27a, 27b to pivotally connect with the support links 29. The support links 29 pivotally interconnect the rear axle 24 and the mounting brackets 34 on the support beam 32 to maintain appropriate spacing between axles 24 and 27. The support links 29 are vertically movable with the rear drive axle 24 and pivotable about an axis that is in front of the axis of the rear drive axle 24. The pivotal connection between the support links 29 and the rear drive axle 24 is positionally adjustable in a fore and aft direction to provide for adjustment of the tension in the chain drive mechanism 26a, as will be described in greater detail below. The support beam 32 is also connected to a central support bracket 31 which, in turn, is connected to the rearward end of the bogey beam 30 by a ball joint 33a defining the oscillation axis 33 which permits the middle axle 27 to oscillate about a longitudinally extending axis 33 to permit the middle axle 27 to follow ground undulations. The central support bracket 31 also defines a pivotal connection between the bogey beam 30 and the support beam 32 such that the support beam 32 which is fixed to the central support bracket 31 is free to pivot about a bolt defining a transversely extending pivot axis 31a that is eccentric with respect to the transverse axis of the middle axle 27. Accordingly, the middle axle 27 is capable of simultaneous pivotal movement about the transverse axis 31a and the pivotal connections between the support links 29 and the mounting brackets 34. Preferably, the pivotal connection between the support links 29 and the mounting brackets 34 are in alignment with the stub shafts 27a, 27b defining the middle axle 27. The transverse pivot axis 31a is located below the line of the middle axle 27.

The pivotal connection of the support links 29 to the rear drive axle 24 is preferably formed as an assembly that is longitudinally movable to control the tension in the chain drive mechanism 26a. With specific reference to FIG. 4, the position of the support beam 32 on top of the bogey beam depicts the forwardmost adjustable movement of the support links 29. One skilled in the art will readily recognize that a fore-and-aft movement of the support link 29 will cause pivotal movement of the support beam 32 about the transverse pivot axis 31a carried by the rearward end of the bogey beam 30. Accordingly, the normal operative position of the support beam 32 will be at an orientation above the bogey beam 30 to allow for wear adjustment of the chain mechanism 26a, similar to the solid line depiction in FIG. 6.

The rear drive axle 24 is suspended from the frame 12 by a suspension mechanism 60. The rear drive axle 24 is formed with a cross beam 62 interconnecting the two opposing rear drive wheels 25 to provide a rigid support for each of the drive wheels 25 since the drive wheels 25 are not mounted to the frame 12. The cross beam 62 is positioned rearward of the rotational axis 63 of the rear drive wheels 25 to provide space for the drive shaft 26b transferring rotational power from the transmission 11a, which is rotatably powered by the engine 11. Extending forwardly from the cross beam 62 are a pair of curved, or J-shaped, attachment brackets 64 which provide a pivotal connection to the support links 29 and provide a pivotal connection for the suspension struts 65.

The suspension struts 65 are conventional in nature and include a gas cylinder 66 having mounted thereon a concentric spring 67. The top of the gas cylinder 66 is pivotally connected to the frame 12 to permit the generally vertical movement of the rear axle 24 relative to the frame 12 in a cushioned manner, providing a smoother ride characteristic for the utility vehicle 10 than would be found if the rear axle were directly mounted on the frame 12. Preferably, the engine and transmission are mounted on a support pan 69 that is mounted to the suspended rear drive axle 24 to be movable therewith so as to maintain a proper driving relationship between the engine 11 and the transmission 11a and between the transmission 26 and the drive shaft 26b. The forward end of the support pan 69 is carried on the rearward end of the bogey beam 30 by the ball joint 68, however, the ball joint 68 could alternatively connect the front of the support pan 69 to the frame 12.

In operation, as best seen in FIGS. 4–7, the middle axle 27 is free to float with respect to frame 12 of the utility vehicle 10. The vertical movement of the middle axle 27 is accommodated by the pivotal connections of the support links 29, the bogey beam 30 and the support beam 32. The support links 29 imposed a controlled positional relationship with respect to the movements of the middle axle 27 relative to the rear drive axle 24, thus keeping the chain drive mechanism 26a in a proper drive transferring condition. The support links 29 do not pivot on a center coincident with the rear drive axle 24, but are pivoted from a point in front of the rear drive axle 24. Accordingly, the pivotal movement of the middle axle 27, as represented by the arc 29a, can slightly shorten the distance between the middle axle 27 and the rear drive axle 24, thus allowing a little slack in the chain drive mechanism 26a to accommodate a slight twisting of the chain drive mechanism 26a when the middle axle oscillates about the ball joint 33a. The floating movement of the middle axle 27 about the rearward end of the support links 29 will maintain acceptable tension in the chain drive mechanism 26a for proper drive transmission to the middle axle 27.

Furthermore, the middle axle 27 is mounted on the rearward end of the bogey beam 30 and any vertical floating movement of the middle axle 27 must also move in conjunction with the limits imposed by the bogey beam structure 30, as represented by the arc 30a. Since the support beam 32 is pivotally connected to the rear end of the bogey beam 30 by the central support bracket 31, the support beam 32 is capable of pivoting rearwardly about the pivot axis 31a, as represented by the arc 32a. Accordingly, the middle axle 27 vertically floats through pivot arcs 29a, 30a, and 32a that coordinate to provide substantially vertical movement for the middle axle 27.

Figure 6:
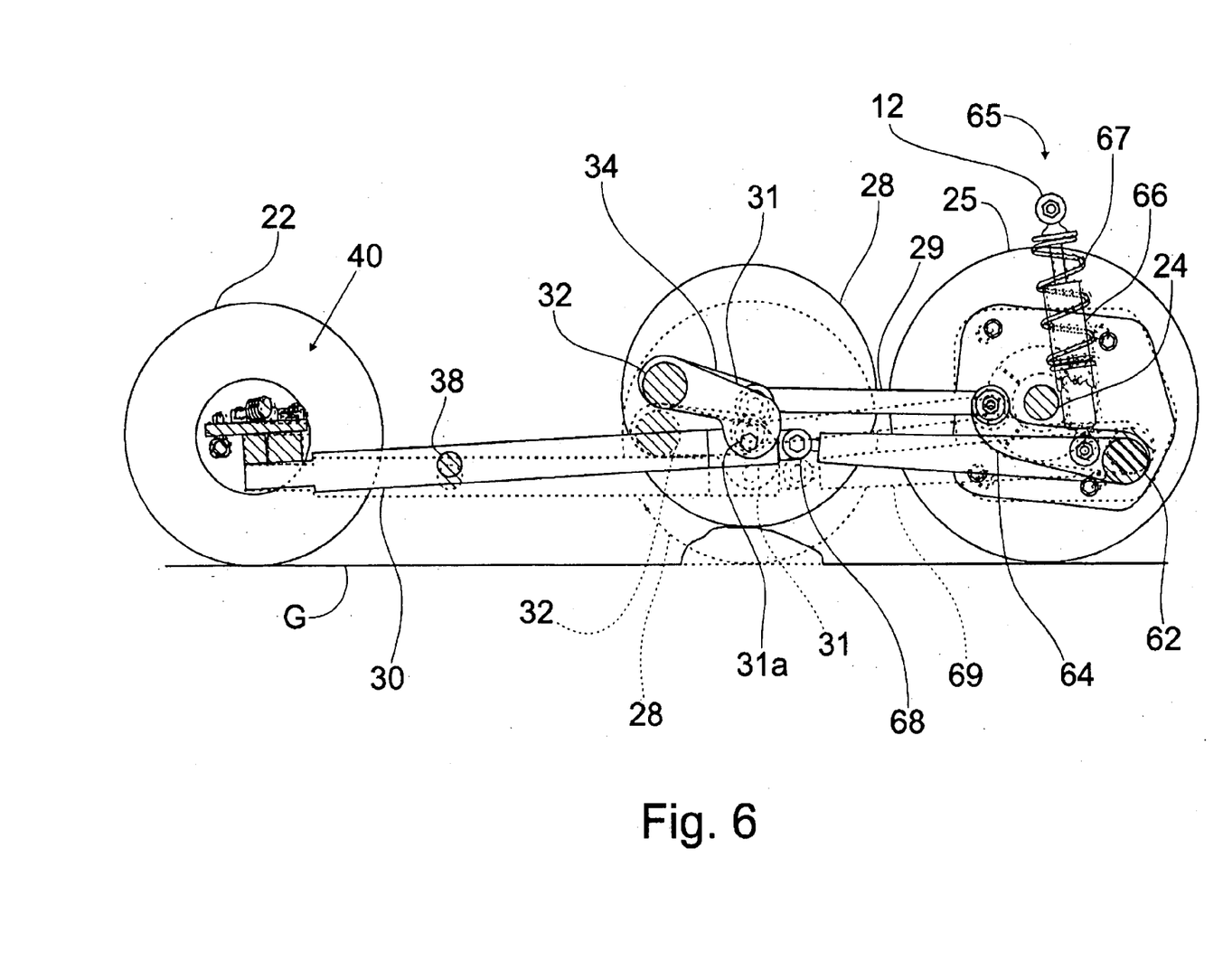
FIG. 6 is an enlarged schematic cross-sectional view similar to that of FIG. 4 but showing flotational movement of the middle axle, the normal position of the middle axle being shown in phantom.

The vertical floating movement of the middle axle 27 is best shown in FIG. 6. The normal position of the middle axle 27 is shown in phantom lines, while the raised position of the middle axle 27 to accommodate a ground undulation is shown in solid lines. The vertical movement of the middle axle 27 raises the rearward end of the bogey beam 30, pivoting the bogey beam 30 about the front axle 20, and slightly raises the operator compartment 13 as represented by the vertical movement of the transverse pivot 38. The pivotal movement of the middle axle 27 with respect to the support links 29 results in a corresponding pivotal movement of the central support bracket 31 about pivot axis 31a, causing the support beam 32 to raise above the bogey beam 30. This flotational capability of the middle axle 27 results in a smoother ride for the operator than is known in the prior art construction with the middle axle 27 fixed to the frame 12.

The downward vertical movement of the middle axle 27 results in a similar operation of the pivot arcs 29a, 30a, and 32a. The downward displacement of the middle axle 27 moves the rearward end of the bogey beam 30 downwardly along the arc 30a. The fixed length of the support links 29 results in a pivotal movement of the support beam 32 about the transverse pivot axis 31a, raising the support beam 32 relative to the bogey beam 30.

Figure 7:
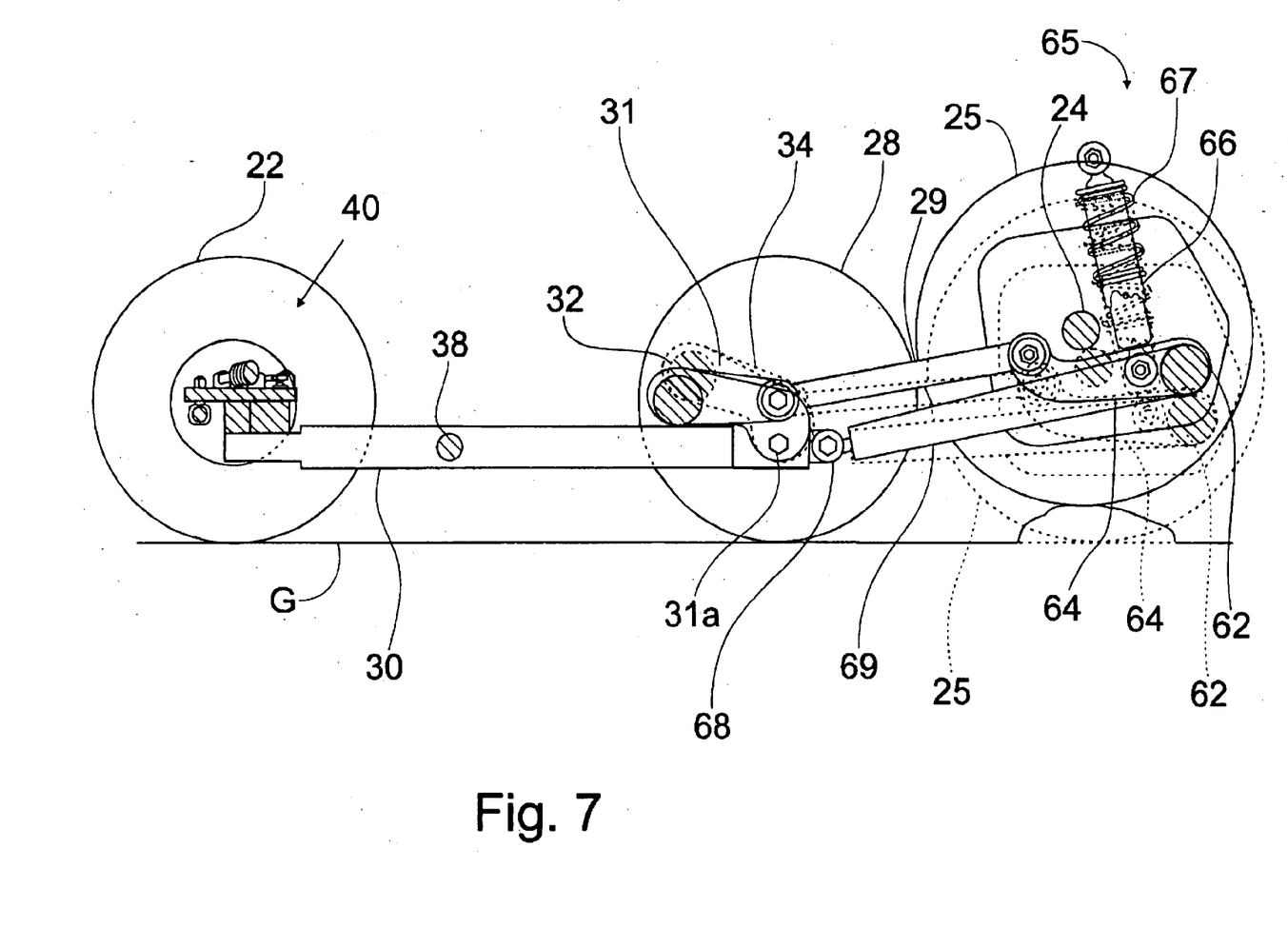
FIG. 7 is an enlarged schematic cross-sectional view similar to that of FIG. 6 but showing flotational movement of the rear axle, the normal position of the rear axle being shown in phantom.

The movement of the rear drive axle 24 is best seen in FIG. 7. Upward vertical movement of the rear axle 24 collapses the suspension strut 65 and allows the drive wheels 25 to move upwardly until the gas cylinder 66 bottoms out. Similarly, downward vertical movement of the rear axle 24 will extend the suspension strut 65 until extension limits are reached. In both cases, the concentric spring 67 biases the gas cylinder 66 back toward the neutral position. Fore-and-aft movement of the rear axle 24 is restricted by the ball joint 68 connecting the support pan 69 to the rear of the bogey beam 30, although the ball joint 68 could also connect the support pan 69 or frame 12. Although vertical movement of the rear axle 24 will cause minor longitudinal movement of the rear axle 24, the support links 29 will maintain the positional relationship of the middle axle 27 relative to the rear axle 24. The suspension mechanism 60 permits independent oscillation of the rear drive wheels 25, which would result in substantially independent operation of the corresponding suspension strut 65.

Figure 8:
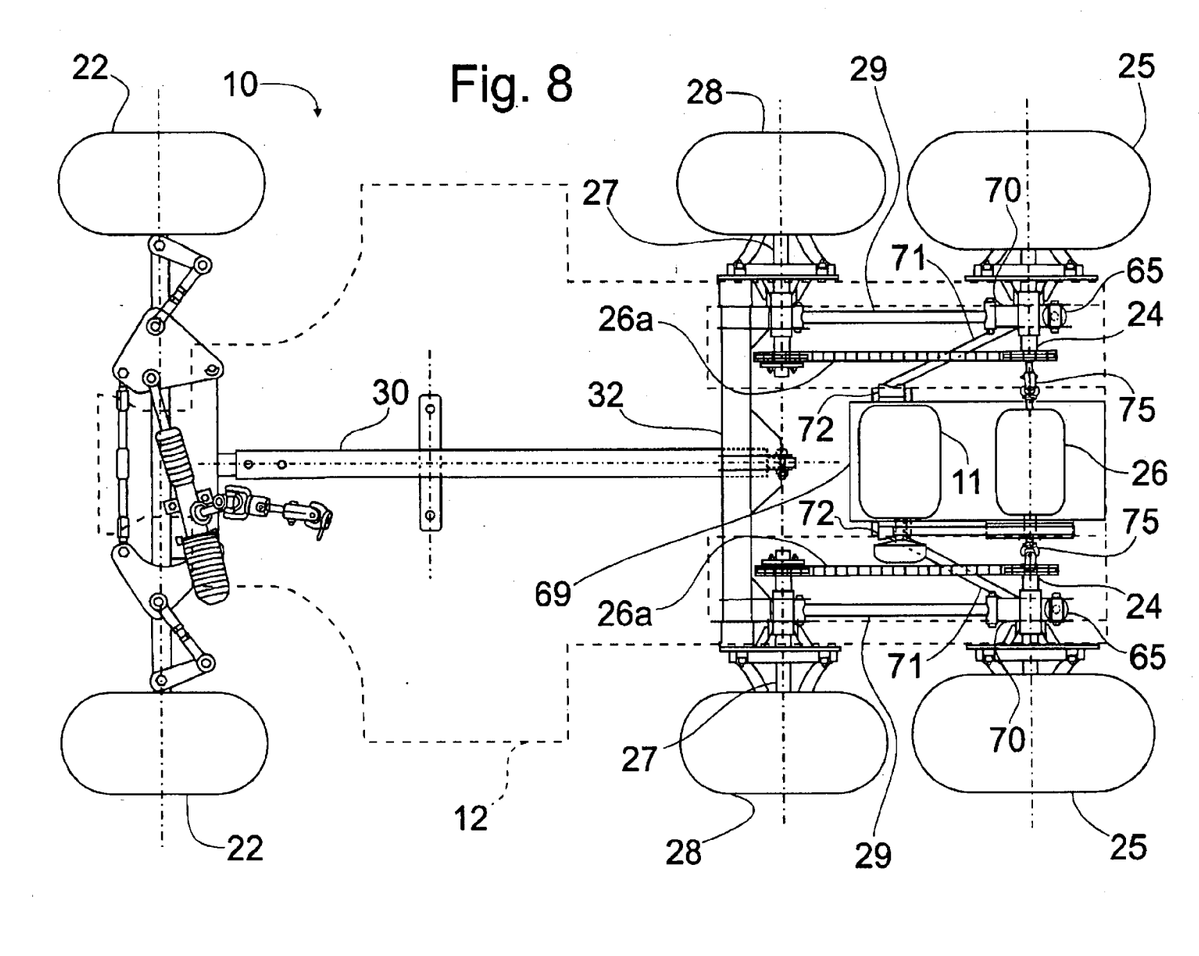
FIG. 8 is a top plan view of an alternative embodiment of the frame and drive mechanism similar to that of FIG. 3.

Referring now to FIG. 8, an alternative embodiment of the present invention can best be seen. The module support pan 69 is rigidly mounted to the frame and supports the engine 11 and transmission 26. Extending in opposing directions from the transmission 26, the rear axle 24 connects to the transmission 26 by universal joints 75 to permit vertical movement of the opposing rear wheels 25. A drag link assembly 70 includes a diagonally extending arm 71 pivotally connected by a pivot 72 to the front of the module support pan 69. The drag link assembly 70 provides lateral stability for the opposing rear wheels 25. The connecting link 29 extends from the rear portion of this drag link assembly 70 forwardly to the middle axle 27 to provide fore-and-aft stability for the rear axle 24. The suspension struts 65 for the rear axles 24 are mounted at the rear of the drag link assembly 70 and extend vertically to the frame.

One skilled in the art will recognize that the principles of the present invention can be applied to a utility vehicle having only two axles, a front steerable axle and a rear drive axle. The bogey beam 30 can still be utilized in a two axle configuration by positioning a strut (not shown) at the rearward end of the bogey beam to offset the front axle mounted to the forward end of the bogey beam.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A utility vehicle comprising:
   a frame;
   a rear drive axle suspended from said frame and having a pair of drive wheels rotatably supported thereon;
   a front steering axle having a pair of steered wheels pivotally mounted thereon;
   a middle axle having a pair of support wheels mounted at opposing ends thereof;
   a longitudinally extending bogey beam pivotally connected to the frame and having a forward end and a rearward end, said steering axle being connected to said forward end of said bogey beam and said middle axle being connected to said rearward end of said bogey beam;
   a suspension mechanism interconnecting said frame and said rear drive axle to permit generally vertical movement of said rear drive axle relative to said frame; and
   support links interconnecting the rear drive axle and the middle axle to maintain fore-and-aft relationship between the middle axle and the rear drive axle.

2. The utility vehicle of claim 1, wherein said rear drive axle includes a cross beam member interconnecting the drive wheels, said cross beam member being spaced from an axis of rotation of said drive wheels.

3. The utility vehicle of claim 1, wherein said suspension mechanism includes a pair of suspension struts pivotally connected at an upper end to said frame and pivotally connected at a lower end to the rear drive axle.

4. The utility vehicle of claim 3, wherein each said suspension strut includes a gas cylinder having a concentric spring mounted thereon to bias said gas cylinder into a neutral position.

5. The utility vehicle of claim 2, wherein said cross beam member includes attachment brackets projecting forwardly thereof, each of the support links being pivotally connected to one of the attachment brackets and extending forwardly thereof for connection to said middle axle.

6. The utility vehicle of claim 5, wherein said support links are pivotally connected to said attachment brackets at a position spaced from said axis of rotation of said drive wheels, said support links being positionally movable relative to said attachment brackets to adjust the spacing between said middle axle and said drive axle.

7. The utility vehicle of claim 6, further comprising a chain drive mechanism operatively interconnecting said rear drive axle and said middle axle to provide rotational power to said middle axle, the positional adjustment of said support links providing tension adjustment in said chain drive mechanism.

8. The utility vehicle of claim 7, further comprising a drive apparatus including an engine providing rotational power to said rear drive axle, said drive apparatus being mounted on a support member coupled at a forward end thereof to said bogey beam.

* * * * *